US012421153B2

(12) United States Patent
Zhao et al.

(10) Patent No.: US 12,421,153 B2
(45) Date of Patent: Sep. 23, 2025

(54) ROTARY TRANSITION SECTION AND TEMPERING AND FORMING APPARATUS FOR FORMING BENT GLASS

(71) Applicant: LUOYANG LANDGLASS TECHNOLOGY CO., LTD., Luoyang (CN)

(72) Inventors: Yan Zhao, Luoyang (CN); Youcheng Zhu, Luoyang (CN); Xiaochen Cui, Luoyang (CN); Zhiyong Shi, Luoyang (CN)

(73) Assignee: Luoyang Landglass Technology Co., Ltd. (CN)

( * ) Notice: Subject to any disclaimer, the term of this patent is extended or adjusted under 35 U.S.C. 154(b) by 561 days.

(21) Appl. No.: 17/908,519

(22) PCT Filed: Mar. 4, 2021

(86) PCT No.: PCT/CN2021/079065
§ 371 (c)(1),
(2) Date: Aug. 31, 2022

(87) PCT Pub. No.: WO2021/179985
PCT Pub. Date: Sep. 16, 2021

(65) Prior Publication Data
US 2023/0159368 A1  May 25, 2023

(30) Foreign Application Priority Data

Mar. 13, 2020  (CN) .......................... 202010176352.8

(51) Int. Cl.
*C03B 23/025* (2006.01)
*C03B 23/033* (2006.01)
(Continued)

(52) U.S. Cl.
CPC ...... *C03B 23/0254* (2013.01); *C03B 23/0256* (2013.01); *C03B 23/033* (2013.01);
(Continued)

(58) Field of Classification Search
CPC ............ C03B 23/0254; C03B 23/0256; C03B 23/033; C03B 35/166; C03B 35/16–189
See application file for complete search history.

(56) References Cited

U.S. PATENT DOCUMENTS 3,871,855 A   3/1975  Frank
4,773,925 A * 9/1988  Schultz ................. C03B 35/187
                                                       65/273

(Continued)

FOREIGN PATENT DOCUMENTS

CN    1576198 A  *  2/2005  ........... C03B 35/163
CN  102826742 A     12/2012
(Continued)

OTHER PUBLICATIONS

CN-108017265-A (Zhao) May 11, 2018 (English language translation). [online] [retrieved Apr. 16, 2024]. Retrieved from: Clarivate Analytics. (Year: 2018).*

(Continued)

*Primary Examiner* — Erin Snelting
(74) *Attorney, Agent, or Firm* — DLA PIPER LLP (US); Blake W. Jackson; Thomas J. Fuller (57) ABSTRACT

The present disclosure relates to a rotary transition section and a tempering and forming apparatus for forming bent glass. The rotary transition section includes a main rack and an auxiliary rack. A plurality of flexible shaft rollers for forming glass are arranged at intervals on the auxiliary rack along the glass conveying direction. An end of the auxiliary rack that is closer to a heating furnace is rotatably connected to the main rack. An end of the auxiliary rack that is away (Continued)

from the heating furnace is connected to a traction mechanism arranged on the main rack. In the tempering and forming apparatus employing the rotary transition section, a forming and tempering section has a lifting function to achieve abutment against a roller surface after the rotation of the transition section, which in turn solves the technical problem that the edge of the glass is difficult to form.

18 Claims, 5 Drawing Sheets

(51) Int. Cl.
    *C03B 27/04*     (2006.01)
    *C03B 29/08*     (2006.01)
    *C03B 35/16*     (2006.01)

(52) U.S. Cl.
    CPC .......... *C03B 27/0426* (2013.01); *C03B 29/08* (2013.01); *C03B 35/163* (2013.01); *C03B 35/165* (2013.01); *C03B 35/166* (2013.01)

(56) References Cited

U.S. PATENT DOCUMENTS 5,470,366 A * 11/1995 Frank ................... C03B 23/0357
    65/273
7,497,096 B2 * 3/2009 Asai ...................... C03B 35/165
    198/782

FOREIGN PATENT DOCUMENTS

| | | | | |
|---|---|---|---|---|
| CN | 108017265 A | * | 5/2018 | ........... C03B 23/023 |
| CN | 109748486 A | | 5/2019 | |
| CN | 111302611 A | | 6/2020 | |
| CN | 111348820 A | | 6/2020 | |
| CN | 111423103 A | | 7/2020 | |
| CN | 111453978 A | | 7/2020 | |
| CN | 211999461 U | | 11/2020 | |

OTHER PUBLICATIONS

CN-1576198-A (ASAI) Feb. 9, 2005 (English language translation). [online] [retrieved Apr. 16, 2024]. Retrieved from: Clarivate Analytics. (Year: 2005).*
CN-102826742-A (SHI) Dec. 19, 2012 (English language translation). [online] [retrieved Apr. 15, 2024]. Retrieved from: Espacenet. (Year: 2012).*
International Search Report (with partial translation) and Written Opinion dated Jun. 4, 2021, issued in corresponding International Patent Application No. PCT/CN2021/079065.

* cited by examiner

ROTARY TRANSITION SECTION AND TEMPERING AND FORMING APPARATUS FOR FORMING BENT GLASS

CLAIM FOR PRIORITY

This application is a U.S. national phase entry under 35 U.S.C. § 371 from PCT International Application No. PCT/CN2021/079065 filed on Mar. 4, 2021, which is based upon and claims the benefit of priority from prior Chinese Patent Application No. CN202010176352.8 filed on Mar. 13, 2020. The entire contents of the above applications are incorporated herein by reference.

TECHNICAL FIELD

The present disclosure relates to the field of bending tempered glass processing, and in particular, to a rotary transition section and a tempering and forming apparatus for forming bent glass.

BACKGROUND

At present, during manufacturing of bent tempered glass having an extra-long panel, due to the large glass panel, it is necessary to form glass by transition. In the conventional method of transitional forming, middle portions of flexible shaft rollers are kept level, and two end portions of the flexible shaft rollers gradually become curved. In this case, after glass is discharged from a furnace and passes through the flexible shaft roller in the transition section, the glass is transferred to a forming and tempering section in an obliquely upward or obliquely downward direction. In the forming and tempering section, the glass moves horizontally. Therefore, a transition point of two postures of the glass exists between the transition section and the forming and tempering section. At the transition point, edges of the glass easily become dangling due to loss of support during operation, eventually causing the edges of the glass to exhibit wave bending, which makes the glass unable to form and fail to meet the requirements for dimensional accuracy. Therefore, the transition section and the tempering and forming apparatus are required to be improved to resolve the technical problem.

SUMMARY

The present disclosure is intended to provide a rotary transition section and a tempering and forming apparatus for forming bent glass. The transition section has a rotatable auxiliary rack. After the flexible shaft rollers become curved, through rotation of the auxiliary rack and raising and lowering of a forming and tempering section, the transition section and the forming and tempering section are smoothly engaged. In this way, the phenomena of the transition point and the dangling glass are eliminated, which in turn solves the technical problem that edges of the glass are difficult to form.

In order to achieve the objective, the present disclosure adopts the following technical solutions. A rotary transition section for forming bent glass is provided, the rotary transition section comprising a main rack and an auxiliary rack. A plurality of flexible shaft rollers for forming glass are arranged at intervals on the auxiliary rack along the glass conveying direction. The flexible shaft rollers are controlled to be curved by a flexible shaft curve forming mechanism arranged on the auxiliary rack. A roller surface formed by the plurality of flexible shaft rollers in a linear state is coplanar with a roller surface in a heating furnace. An end of the auxiliary rack that is closer to the heating furnace is rotatably connected to the main rack, with a rotating axis being collinear with the central axis of the first flexible shaft roller in the linear state and being parallel to a roller of the heating furnace, and an end of the auxiliary rack that is away from the heating furnace is connected to a traction mechanism arranged on the main rack.

A lug connected to the traction mechanism is arranged on the auxiliary rack.

The traction mechanism comprises a motor, a driving wheel, a chain, and a transmission shaft. The motor and the transmission shaft are both mounted to the top of the main rack, and the transmission shaft is configured to be driven by the motor to rotate. The driving wheel is mounted to two ends of the transmission shaft, and the driving wheel is configured to pull the auxiliary rack through chain.

Profiles for mounting the flexible shaft rollers are arranged on the auxiliary rack at intervals along the glass conveying direction, and the flexible shaft rollers and the profiles are arranged in parallel and in a one-to-one correspondence from up to down.

Further, the flexible shaft curve forming mechanism comprises elastomers and a height adjustment mechanism. The flexible shaft rollers are parallel to the elastomers and are mounted to the elastomers through a flexible shaft base. Middle portions of the elastomers are fixed to the profiles, and the height adjustment mechanism is configured to control the connected elastomers to bend into curves, so as to cause the flexible shaft rollers to be curved.

Further, the flexible shaft rollers are configured to be driven through middle portions.

Alternatively, the flexible shaft curve forming mechanism may further have the following feasible solution.

First, a plurality of profiles are arranged at intervals on the auxiliary rack along a direction perpendicular to the glass conveying direction. The length direction of the profile is parallel to the glass conveying direction, each of the flexible shaft rollers is rotatably mounted to the plurality of profiles through a roller base, and the flexible shaft roller is perpendicular to the profiles.

Second, the flexible shaft curve forming mechanism comprises a toothed plate structure and a curve forming motor. The toothed plate structure mainly comprises toothed plates meshed with each other and a connecting rod. The toothed plate and the profiles are configured to be hinged by spherical hinges. The curve forming motor is arranged on the top of the auxiliary rack, and is configured to pull two ends of the toothed plate structure through chain.

Third, fixing plates for mounting the spherical hinge are arranged on two ends in the profile length direction. The ball head of a spherical hinge is arranged on the fixing plate, and the ball socket of the spherical hinge is arranged on a connecting body on the toothed plate structure. Alternatively, the ball head of a spherical hinge is arranged on the connecting body of the toothed plate structure, and the ball socket of the spherical hinge is arranged on the fixing plate.

A manual driving apparatus is arranged on the auxiliary rack and is configured to manually drive rotation of the flexible shaft rollers.

A pressing wheel mechanism is arranged on the auxiliary rack. The pressing wheel mechanism is arranged on an end of the auxiliary rack through a lifting apparatus, and pressing wheels in the pressing wheel mechanism are arranged up and down correspondingly to rollers of the plurality of flexible shaft rollers at an outlet end of the transition section to press against the upper surface of the glass.

The pressing wheel mechanism further comprises elastomers and a curve forming driving mechanism. The elastomers are arranged above the flexible shaft rollers and are parallel to the flexible shaft rollers. The pressing wheels are arranged at intervals along the length direction of the elastomers. The curve forming driving mechanism is arranged on a movable bracket on the upper portion of the auxiliary rack, and the curve forming driving mechanism is configured to control the elastomers to bend into curves.

The curve forming driving mechanism is a linear driving mechanism.

An auxiliary heating section is arranged on the movable bracket.

A tempering and forming apparatus for bent glass is provided, the tempering and forming apparatus comprising a heating furnace, a transition section, and a forming and tempering section. The transition section is the above rotary transition section, and the forming and tempering section has a lifting mechanism configured to raise and lower a roller surface of the forming and tempering section to abut against a roller surface obtained after the transition section becomes curved.

Beneficial effects of the present disclosure are as follows. In the present disclosure, after the flexible shaft roller gradually becomes curved, through the rotation of the auxiliary rack and raising and lowering of the forming and tempering section, the transition section and the forming and tempering section are smoothly engaged. When the glass is gradually formed and enters the subsequent forming and tempering section, edges of the glass are always supported by the flexible shaft rollers, thereby preventing the edges from dangling, and eliminating wave bending phenomena of the edges.

The manual driving apparatus provided in the present disclosure may be for emergency use during a failure of the motor driving the rotation of the flexible shaft roller or during a power failure, and the rotation of the flexible shaft roller is manually driven to continue conveying the glass forward.

The pressing wheel mechanism arranged at the end of the transition section of the present disclosure may press on the upper surface of the glass through the pressing wheels to correct the shape of the formed glass.

When the transition section gradually becomes curved, the first flexible shaft roller on an inlet side should be kept level, and the subsequent flexible shaft rollers become curved in sequence. In this regard, the present disclosure provides two implementation structures. In one structure, the elastomers for mounting the flexible shaft rollers are raised up through the height adjustment mechanism. When the elastomers are raised up by different heights, the elastomers can become curved. The other is a conventional toothed plate structure. For the curve forming mechanism of the conventional toothed plate structure, the curve is formed by pulling the plurality of profiles supporting the flexible shaft rollers to different heights. For a certain profile, the flexible shaft roller on the inlet side of the transition section is mounted on one end of the profile, and the flexible shaft roller on the outlet side of the transition section is mounted on the other end of the profile. The profile is a rigid structure, and therefore it is difficult to make one end level and the other end lifted. Therefore, in the present disclosure, the profiles and the toothed plates are hinged through the spherical hinge. In this way, an end that is away from the heating furnace can be curved to form the target arc through the curve forming mechanism. Due to the existence of the spherical hinge, the curve forming mechanism that is closer to the heating furnace does not operate first, so that the first flexible shaft roller that is closer to the heating furnace can be maintained level.

Reference Numerals: 1. Main rack, 2. Auxiliary rack, 3. Hinge mechanism, 4. Transmission shaft, 5. Motor, 6. Driving wheel, 7. Chain, 8. Flexible shaft roller, 9. Lug, 10. Flexible shaft curve forming mechanism, 11. Heating section, 12. Transition section, 13. Forming and tempering section, 14. Linear roller, 15. End portion of flexible shaft roller, 16. Middle portion of flexible shaft roller, 17. Pressing wheel mechanism, 18. Lifting apparatus, 19. Auxiliary heating section, 20. Manual driving apparatus, 21. Crank, 22. Pressing wheel, 23. Aluminum profile square tube, 24. Toothed plate structure, 25. Intermediate support, 26. Spherical hinge, 27. Connecting body.

DETAILED DESCRIPTION

The present disclosure is further described in detail below with reference to the accompanying drawings and embodiments, which is not used as a basis for limiting the present disclosure.

Figure 1:
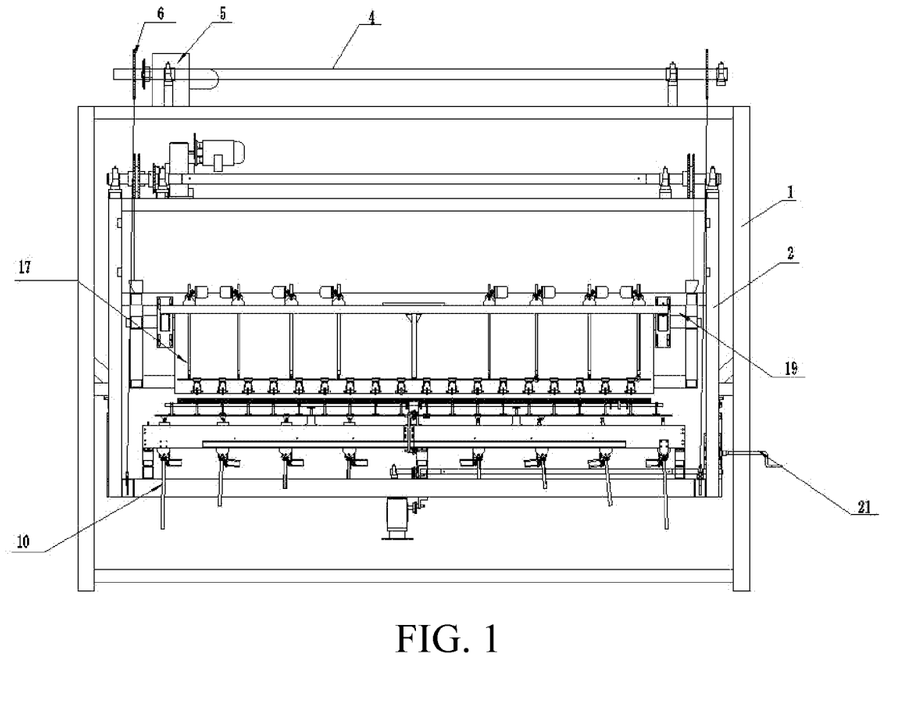
FIG. 1 is a front view of the present disclosure.
Figure 2:
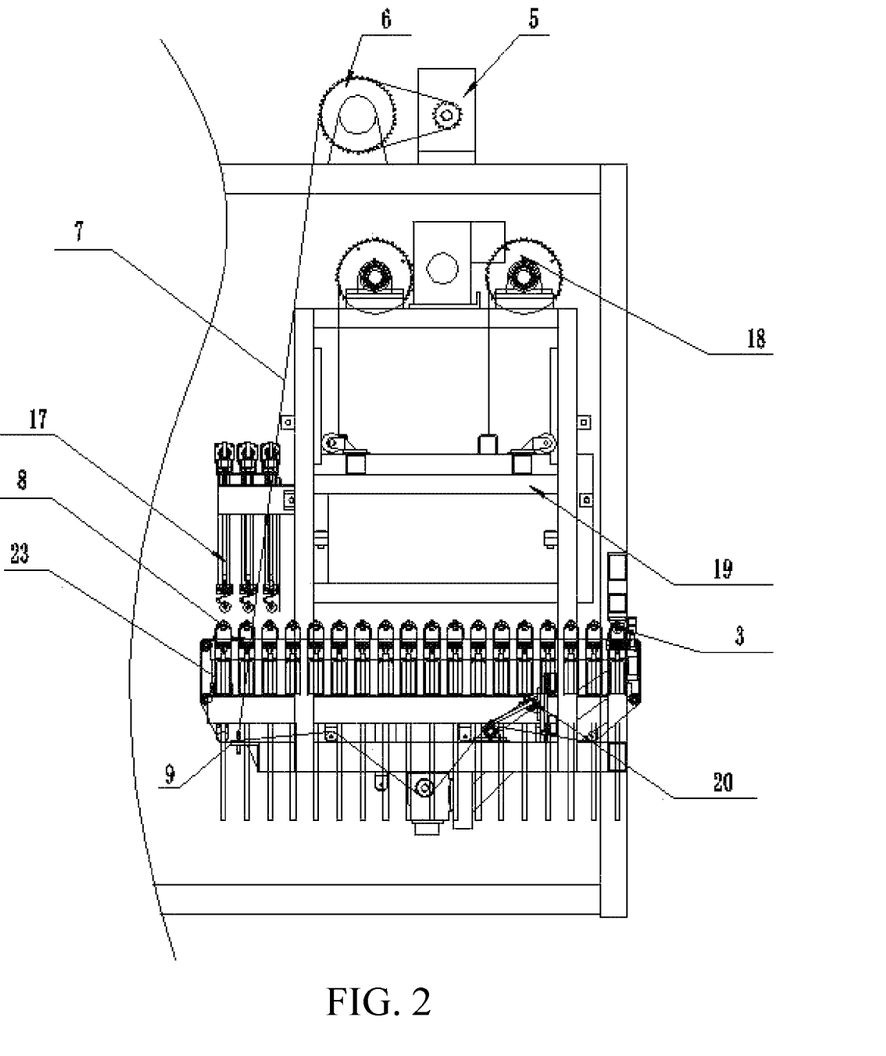
FIG. 2 is a partial side view of the present disclosure.

Embodiment 1: Referring to FIG. 1 and FIG. 2, a rotary transition section for forming bent glass is shown, the rotary transition section comprising a main rack 1 and an auxiliary rack 2. A plurality of aluminum profile square tubes 23 are fixedly arranged at intervals on the auxiliary rack 2 along a glass conveying direction. One flexible shaft roller 8 parallel to the aluminum profile square tube is correspondingly arranged above each aluminum profile square tube 23, and the flexible shaft rollers 8 are curved by a corresponding flexible shaft curve forming mechanism 10. A roller surface formed by the plurality of flexible shaft rollers 8 in a linear state is coplanar with a roller surface in a heating furnace. An end of the auxiliary rack 2 that is closer to the heating furnace is rotatably connected to the main rack 1 in a hinged manner, with a rotating axis being collinear with the central axis of the first flexible shaft roller 8 in the linear state and being parallel to a roller of the heating furnace. The hinging is realized by using a hinge mechanism 3, such as a hinge pin. An end of the auxiliary rack 2 that is away from the heating furnace is connected to a traction mechanism arranged on the main rack 1.

The traction mechanism comprises a motor 5, a driving wheel 6, a chain 7, and a transmission shaft 4. The motor 5 and the transmission shaft 4 are both mounted to the top of the main rack 1. The transmission shaft 4 is configured to be driven by the motor 5 to rotate. The driving wheel 6 is mounted to two ends of the transmission shaft 4, and the driving wheel 6 is configured to pull the auxiliary rack 2 through the chain 7. Lower ends of the two chains 7 may be connected to the lug 9 on two sides of the auxiliary rack 2 in the width direction.

Figure 3:
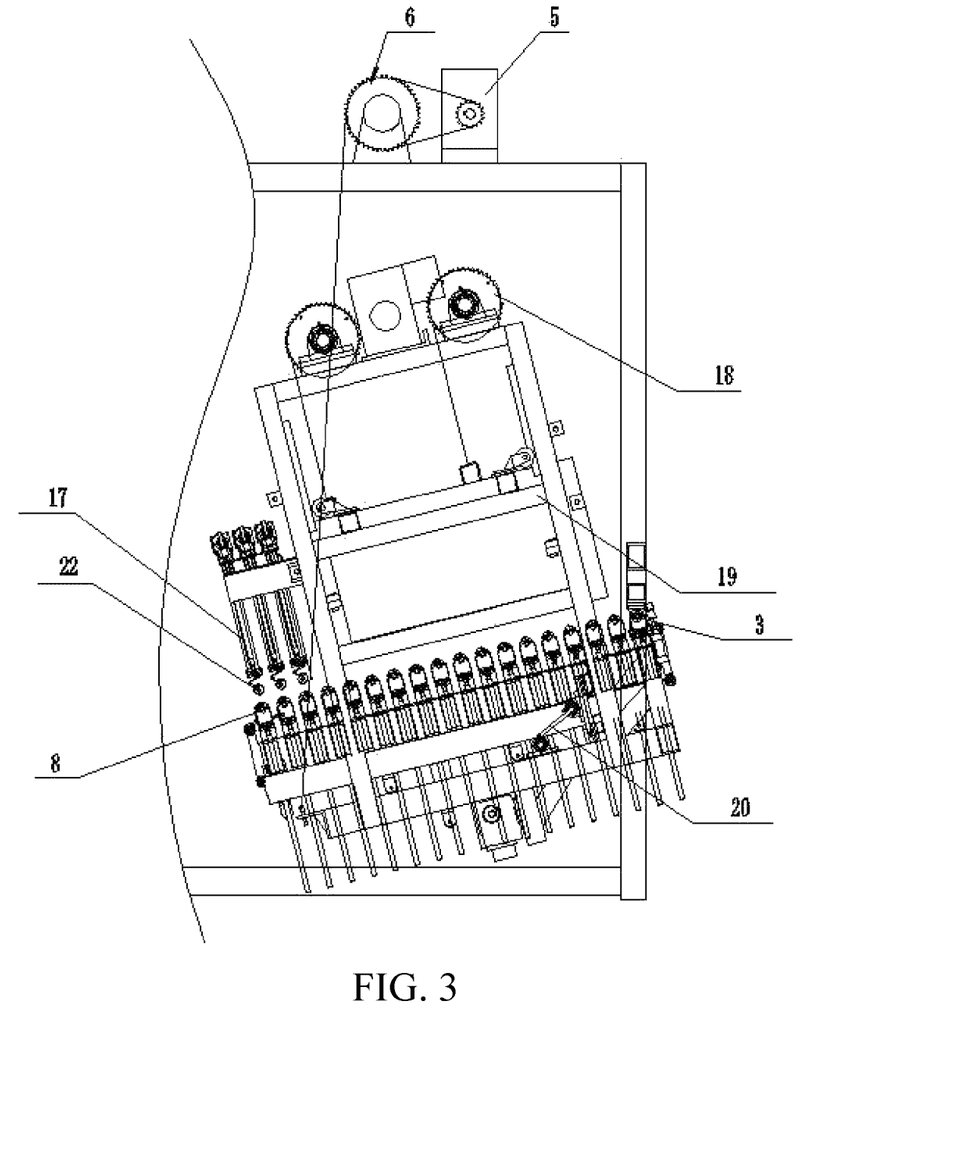
FIG. 3 is a schematic diagram of a state in which an auxiliary rack rotates downward according to the present disclosure.
Figure 4:
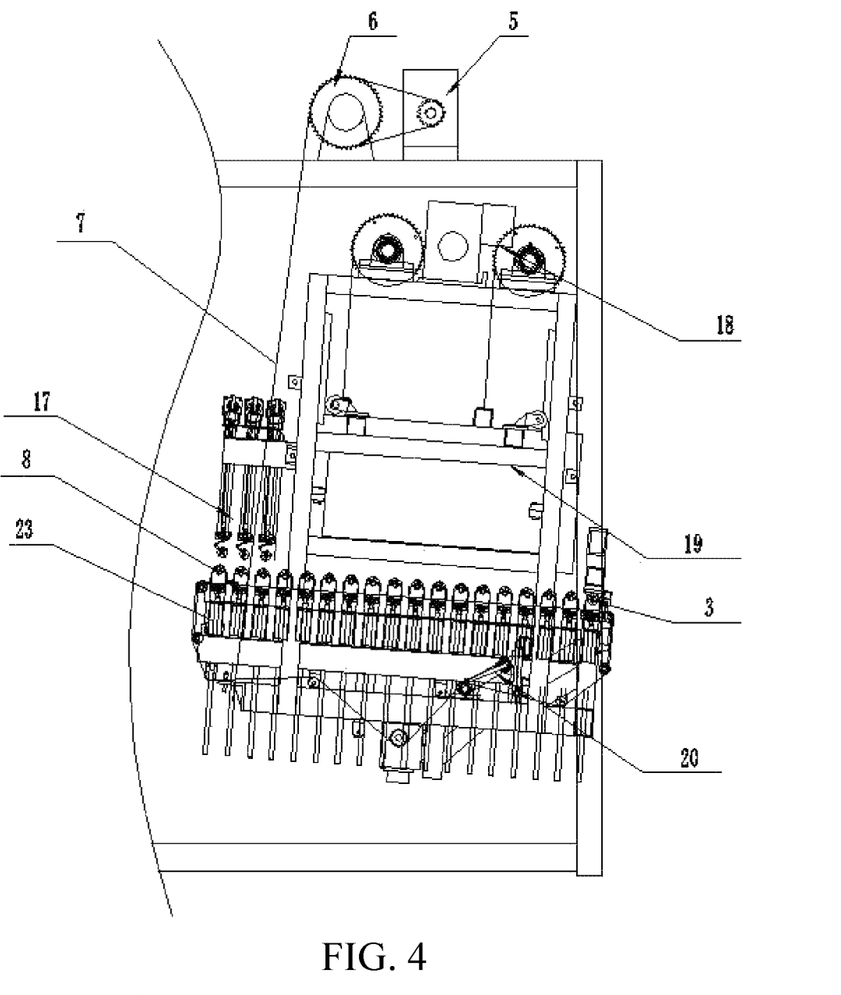
FIG. 4 is a schematic diagram of a state in which an auxiliary rack rotates upward according to the present disclosure.

When the auxiliary rack 2 is required to rotate, the chain 7 is pulled by the motor 5, and the auxiliary rack 2 may be rotated upward, as shown in FIG. 4. When the operation of motor 5 is reversed and the chain 7 is released, the auxiliary rack 2 rotates downward, as shown in FIG. 3. FIG. 3 and FIG. 4 only show a diagram of a state in which the auxiliary rack rotates. The flexible shaft rollers 8 do not become curved. In actual use, the flexible shaft rollers 8 are required to first gradually become curved, and then the auxiliary rack 2 is rotated, so as to realize engagement between the last flexible shaft roller 8 and the forming and tempering section.

The flexible shaft rollers 8 become curved by the flexible shaft curve forming mechanism 10. The flexible shaft curve forming mechanism 10 comprises elastomers and a height adjustment mechanism. The flexible shaft rollers 8 are parallel to the elastomers, and are mounted to the elastomers through a flexible shaft base. Middle portions of the elastomers are fixed to the aluminum profile square tubes 23. The height adjustment mechanism is symmetrically arranged on two sides of a fixed position in middle portions of the elastomers along the length direction of the elastomers. The elastomers are controlled to be curved through the height adjustment mechanism, so as to cause the flexible shaft roller to be curved. The height adjustment mechanism may be a motor-driven screw nut mechanism or an electric push rod. The structure of the above flexible shaft curve forming mechanism 10 has been disclosed in a prior Chinese patent application of the applicant with the application number of 201910102891.4.

The flexible shaft rollers 8 are configured to be driven through middle portions. The middle portions of the flexible shaft rollers 8 are connected to a roller transmission shaft. The roller transmission shaft is arranged on the auxiliary rack 2. And a manual driving apparatus is arranged on the auxiliary rack 2 and is configured to manually drive the roller transmission shaft.

A pressing wheel mechanism 17 is arranged on the auxiliary rack 2. The pressing wheel mechanism 17 is arranged on the end of the auxiliary rack 2 and fixed to a movable bracket on the upper portion of the auxiliary rack 2. Pressing wheels 22 in the pressing wheel mechanism 17 are arranged up and down correspondingly to rollers of the plurality of flexible shaft rollers 8 at an outlet end of the transition section to press against the upper surface of the glass. The movable bracket is connected to a lifting apparatus 18, and the lifting apparatus 18 realizes raising and lowering of the pressing wheel mechanism 17 by raising the movable bracket.

The pressing wheel mechanism 17 further comprises a pressing wheel curve forming mechanism. A structure of the pressing wheel curve forming mechanism is the same as that of the above flexible shaft curve forming mechanism 10, which mainly comprises elastomers and a curve forming driving mechanism.

In the pressing wheel curve forming mechanism, the elastomers are arranged above the flexible shaft rollers 8 and are parallel to the flexible shaft rollers 8. The elastomers are connected to the curve forming driving mechanism. The pressing wheels 22 are arranged at intervals along the length direction of the elastomer. The curve forming driving mechanism is arranged on the movable bracket on the upper portion of the auxiliary rack 2, and the curve forming driving mechanism is configured to control the elastomers to bend into curves.

The pressing wheels 22 may be mounted to the elastomers through a mounting base, or a flexible shaft may be mounted to the elastomers, and the pressing wheel 22 is mounted to the flexible shaft.

The curve forming driving mechanism and the height adjustment mechanism adopt the same structure.

An auxiliary heating section is further arranged on the bracket on the upper portion of the auxiliary rack, and a thermal insulation material for the glass is arranged on the auxiliary heating section.

Figure 5:
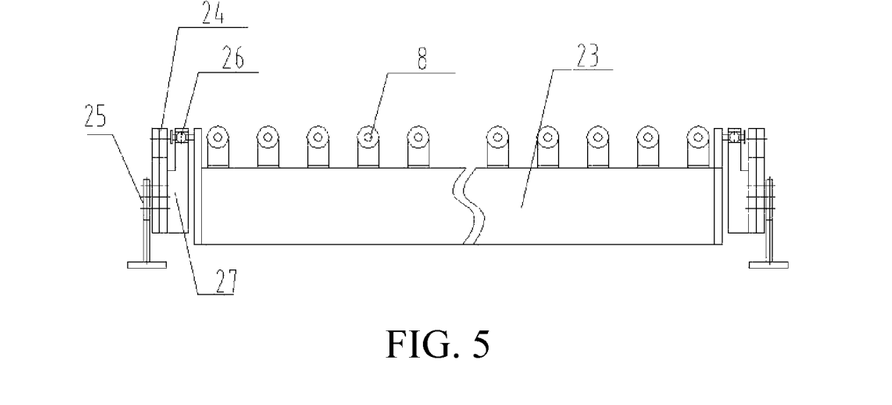
FIG. 5 is a schematic diagram of an arrangement structure of a flexible shaft curve forming mechanism in Embodiment 2 according to the present disclosure.

Embodiment 2: A main difference between this embodiment and Embodiment 1 is that the specific structures of the flexible shaft curve forming mechanism are different. In the art, a commonly used flexible shaft curve forming mechanism is generally a chain plate structure or referred to as a toothed plate structure 24. The structure is also feasible for the present disclosure, but the arrangement of the profiles is required to be optimized.

In this embodiment, the aluminum profile square tubes 23 are arranged at intervals on the auxiliary rack 2 along the direction perpendicular to the glass conveying direction. The length direction of the aluminum profile square tubes 23 is consistent with the glass conveying direction. The flexible shaft rollers 8 are arranged perpendicular to the aluminum profile square tubes 23. Each flexible shaft roller 8 is rotatably mounted to the plurality of aluminum profile square tubes 23 through the roller base.

As shown in FIG. 5, the flexible shaft curve forming mechanism 10 adopts the toothed plate structure 24 and the curve forming motor commonly used in the art. Two sets of toothed plate structures 24 may be arranged respectively on two ends of the aluminum profile square tubes 23 in the length direction. The toothed plate structure 24 mainly comprises a toothed plate and a connecting rod that are rotatably connected. The middle portion of the toothed plate structure 24 is fixed to the auxiliary rack 2 through an intermediate support 25, and two ends of the toothed plate structure 24 are connected to the chain. The curve forming motor is arranged on the top of the auxiliary rack 2, and is configured to pull the two ends of the toothed plate structure 24 through the chain. For a more specific structure of the part, reference may be made to the prior Chinese patent application of the applicant with the application number of 201910102891.4.

The toothed plates and the aluminum profile square tubes 23 are hinged through a spherical hinge 26, and the curve forming motor arranged on the top of the auxiliary rack 2 pulls two ends of the toothed plate structure 24 through the chain, so that the two ends of the aluminum profile square tubes 23 can form different radians. In this way, the flexible shaft rollers 8 on one ends of the aluminum profile square tubes 23 are kept level and the flexible shaft rollers 8 on another end become curved.

A fixing plate for mounting the spherical hinge 26 is arranged on the two ends of the aluminum profile square tubes 23 in the length direction. A ball head of the spherical hinge 26 is arranged on the fixing plate, and a ball socket of the spherical hinge 26 is arranged on a connecting body 27 on the toothed plate. Alternatively, the ball head of the spherical hinge 26 is arranged on the connecting body 27 of the toothed plate, and the ball socket of the spherical hinge 26 is arranged on the fixing plate.

Embodiment 3: The tempering and forming apparatus for bent glass comprises a heating furnace, a transition section, and a forming and tempering section. The heating furnace and the forming and tempering section are both commonly used devices in conventional technologies. The transition section is the foregoing rotary transition section, preferably the rotary transition section described in Embodiment 1. The forming and tempering section has a lifting mechanism, which can raise and lower the roller surface to be engaged with the roller surface of the rotated transition section.

The technical solution of the present disclosure is further described below in combination with Embodiment 3 by using the production of positively-bent double curved glass as an example.

Figure 6:
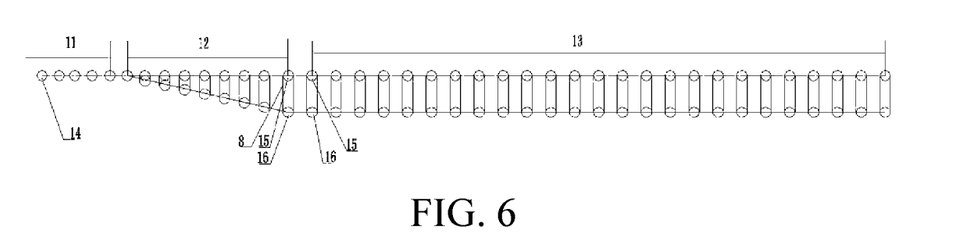
FIG. 6 is a schematic diagram of glass before entering a transition section during production of bent tempered glass according to the present disclosure.

As illustrated, FIG. 6 shows the preparation stage of a related device during the forming of the positively-bent double curved glass. The related device comprises a heating section 11, a transition section 12, and a forming and tempering section 13. The heating section 11 is the above heating furnace, and the transition section 12 uses the structure described in Embodiment 1 of the present disclosure. In order to clearly express the change in the flexible shaft rollers 8 and the transition between the transition section 12 and the forming and tempering section 13, only relevant rollers are shown in FIG. 6. For example, in the heating section 11, the rollers are linear roller 14, and one linear roller 14 is represented by a circle. In the transition section 11, the flexible shaft rollers are required to gradually become curved, and the first flexible shaft roller 8 is kept level. Therefore, except the first flexible shaft roller 8, for the remaining flexible shaft rollers 8, an upper circle represents an end portion 15 of the flexible shaft roller, and a lower circle represents the middle portion 16 of the flexible shaft roller. As shown in FIG. 6, the auxiliary rack 2 for the transition section 12 has been rotated and lifted, so that the transition section is smoothly engaged with the forming and tempering section 13. In the forming and tempering section 13, the flexible shaft rollers 8 become curved in the transverse direction. Therefore, the representation method of the flexible shaft rollers 8 is the same as that of the transition section, that is, the upper circle represents the end portion 15 of the flexible shaft roller, and the lower circle represents the middle portion 16 of the flexible shaft roller.

The middle portions 16 of the flexible shaft rollers in the present disclosure are the middle portions of the flexible shaft rollers 8 in the length direction. The transverse direction is the direction perpendicular to the glass movement direction. Therefore, the glass movement direction is the longitudinal direction.

The steps of forming the positively-bent double curved glass are as follows.

First, the first flexible shaft roller 8 (that is closer to the heating furnace) in the transition section 12 and the linear roller 14 in the heating section 11 are kept level. A transverse curvature of the last flexible shaft roller 8 (that is away from the heating furnace) in the transition section 12 and a transverse curvature of the flexible shaft rollers 8 in the forming and tempering section 13 after becoming curved are maintained the same through the flexible shaft curve forming mechanism 10, and both are the target curvature. In addition, the remaining flexible shaft rollers 8 in the transition section 12 become curved in sequence according to a transition mode, and the curve forming of the flexible shaft rollers 8 means that the middle portions of the flexible shaft rollers 8 are not moved and two sides are raised up to different heights by the corresponding height adjustment mechanism, so as to complete the process of becoming curved. In this case, along the glass movement direction, the end portions of the flexible shaft rollers 8 are gradually raised, and the middle portions of the flexible shaft rollers 8 are still level with the linear roller 14 in the heating section 11.

Second, the auxiliary rack 2 of the transition section 12 is rotated downward, so that the end portions of the flexible shaft rollers 8 raised during the curve forming are lowered and on the same level as the first flexible shaft rollers 8 (as shown in FIG. 6). In addition, the roller surface is raised and lowered by the forming and tempering section 13, so that the last flexible shaft roller 8 of the transition section 12 can be smoothly engaged with the flexible shaft rollers 8 gradually becoming curved in the transverse direction in the forming and tempering section 13, thereby eliminating a transition point between the end portions of the flexible shaft rollers 8 of the transition section and the forming and tempering section.

Figure 7:
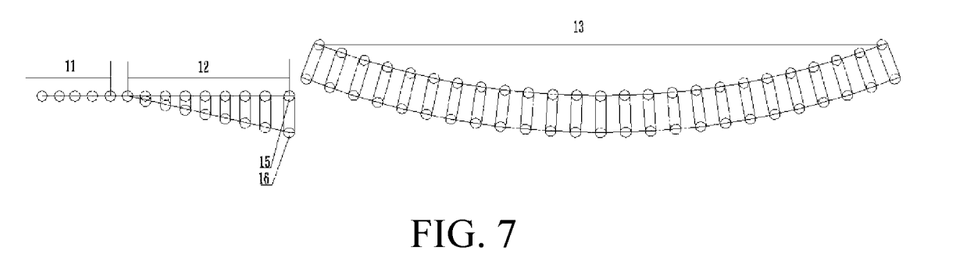
FIG. 7 is a schematic diagram of glass after entering a tempering section during production of bent tempered glass according to the present disclosure.

Finally, the glass is discharged from the heating section 11, is gradually formed along the transition section 12, and smoothly enters the forming and tempering section 13. After the glass completely enters the forming and tempering section 13, a longitudinal curve forming mechanism of the forming and tempering section 13 becomes curved (as shown in FIG. 7), thereby completing the formation of the double curved glass and air tempering.

The foregoing embodiments are merely used for describing the technical solutions of the present disclosure, but are not intended to limit the present disclosure. A person skilled in the art may understand that, modifications or equivalent replacements may be made to specific implementations of the present disclosure with reference to the foregoing embodiments, and such modifications or equivalent replacements without departing from the spirit and scope of the present disclosure shall fall with protection the scope of the pending claims of this application.

What is claimed is:

1. A rotary transition section for forming bent glass, comprising:
   a main rack; and
   an auxiliary rack, wherein a plurality of flexible shaft rollers for forming glass are arranged at intervals on the auxiliary rack in a glass conveying direction, wherein the plurality of flexible shaft rollers are controlled to be curved by a flexible shaft curve forming mechanism arranged on the auxiliary rack, wherein a roller surface formed by the plurality of flexible shaft rollers in a linear state is coplanar with a roller surface in a heating furnace, wherein an end of the auxiliary rack that is closer to the heating furnace is rotatably connected to the main rack, wherein a rotating axis of the auxiliary rack is collinear with a central axis of a first flexible shaft roller of the plurality of flexible shaft rollers in the linear state and is parallel to a roller of the heating furnace, wherein an end of the auxiliary rack that is away from the heating furnace is connected to a traction mechanism arranged on the main rack,
   wherein the traction mechanism comprises a motor, a driving wheel, a chain, and a transmission shaft, wherein the motor and the transmission shaft are both mounted to a top of the main rack, wherein the transmission shaft is configured to be driven by the motor to rotate, wherein the driving wheel is mounted to two ends of the transmission shaft, wherein the driving wheel is configured to pull the auxiliary rack up and down through the chain.

2. The rotary transition section for forming bent glass according to claim 1, wherein a lug connected to the traction mechanism is arranged on the auxiliary rack.

3. The rotary transition section for forming bent glass according to claim 1, wherein profiles for mounting the plurality of flexible shaft rollers are arranged on the auxiliary rack at intervals in the glass conveying direction, wherein the plurality of flexible shaft rollers and the profiles are arranged in parallel and in a one-to-one correspondence from up to down.

4. The rotary transition section for forming bent glass according to claim 3, wherein the flexible shaft curve forming mechanism comprises elastomers and a height adjustment mechanism, wherein the plurality of flexible shaft rollers are parallel to the elastomers and are mounted to the elastomers through a flexible shaft base, wherein middle portions of the elastomers are fixed to the profiles, wherein the height adjustment mechanism is configured to control connected elastomers to bend into curves, so as to cause the plurality of flexible shaft rollers to be curved.

5. The rotary transition section for forming bent glass according to claim 1, wherein the plurality of flexible shaft rollers are configured to be driven through middle portions.

6. The rotary transition section for forming bent glass according to claim 1, wherein a plurality of profiles are arranged at intervals on the auxiliary rack in a direction perpendicular to the glass conveying direction, wherein a profile length direction is parallel to the glass conveying direction, wherein each of the plurality of flexible shaft rollers is rotatably mounted to the plurality of profiles through a roller base, wherein the plurality of flexible shaft rollers are perpendicular to the plurality of profiles.

7. The rotary transition section for forming bent glass according to claim 6, wherein the flexible shaft curve forming mechanism comprises a toothed plate structure and a curve forming motor, wherein the toothed plate structure mainly comprises toothed plates meshed with each other and a connecting rod, wherein the toothed plates and the plurality of profiles are configured to be hinged by a spherical hinge, wherein the curve forming motor is arranged on a top of the auxiliary rack, and is configured to pull two ends of the toothed plate structure through the chain.

8. The rotary transition section for forming bent glass according to claim 7, wherein a fixing plate for mounting the spherical hinge is arranged on two ends in the profile length direction, wherein a ball head of the spherical hinge is arranged on the fixing plate, and a ball socket of the spherical hinge is arranged on a connecting body on the toothed plate structure, or wherein the ball head of the spherical hinge is arranged on the connecting body of the toothed plate structure, and the ball socket of the spherical hinge is arranged on the fixing plate.

9. The rotary transition section for forming bent glass according to claim 1, wherein a manual driving apparatus is arranged on the auxiliary rack, and is configured to manually drive rotation of the plurality of flexible shaft rollers.

10. The rotary transition section for forming bent glass according to claim 1, wherein a pressing wheel mechanism is arranged on the auxiliary rack, wherein the pressing wheel mechanism is arranged on an end of the auxiliary rack through a lifting apparatus, wherein pressing wheels in the pressing wheel mechanism are arranged up and down correspondingly to rollers of the plurality of flexible shaft rollers at an outlet end of the transition section to press against an upper surface of the glass.

11. The rotary transition section for forming bent glass according to claim 10, wherein the pressing wheel mechanism further comprises elastomers and a curve forming driving mechanism, wherein the elastomers are arranged above the plurality of flexible shaft rollers and are parallel to the plurality of flexible shaft rollers, wherein the pressing wheels are arranged at intervals along a length direction of the elastomers, wherein the curve forming driving mechanism is arranged on a movable bracket on an upper portion of the auxiliary rack, wherein the curve forming driving mechanism is configured to control the elastomers to bend into curves.

12. The rotary transition section for forming bent glass according to claim 11, wherein the curve forming driving mechanism is a linear driving mechanism.

13. The rotary transition section for forming bent glass according to claim 11, wherein an auxiliary heating section is arranged on the movable bracket.

14. A tempering and forming apparatus for bent glass, comprising:
a heating furnace;
a transition section comprising:
a main rack; and
an auxiliary rack, wherein a plurality of flexible shaft rollers for forming glass are arranged at intervals on the auxiliary rack in a glass conveying direction, wherein the plurality of flexible shaft rollers are controlled to be curved by a flexible shaft curve forming mechanism arranged on the auxiliary rack, wherein a roller surface formed by the plurality of flexible shaft rollers in a linear state is coplanar with a roller surface in a heating furnace, wherein an end of the auxiliary rack that is closer to the heating furnace is rotatably connected to the main rack, wherein a rotating axis of the auxiliary rack is collinear with a central axis of a first flexible shaft roller of the plurality of flexible shaft rollers in the linear state and is parallel to a roller of the heating furnace, wherein an end of the auxiliary rack that is away from the heating furnace is connected to a traction mechanism arranged on the main rack, wherein the traction mechanism comprises a motor, a driving wheel, a chain, and a transmission shaft, wherein the motor and the transmission shaft are both mounted to a top of the main rack, wherein the transmission shaft is configured to be driven by the motor to rotate, wherein the driving wheel is mounted to two ends of the transmission shaft, wherein the driving wheel is configured to pull the auxiliary rack up and down through the chain; and
a forming and tempering section, wherein the forming and tempering section has a lifting mechanism configured to raise and lower a roller surface of the forming and tempering section to abut against a roller surface obtained after the transition section becomes curved.

15. The tempering and forming apparatus for bent glass according to claim 14, wherein a lug connected to the traction mechanism is arranged on the auxiliary rack.

16. The tempering and forming apparatus for bent glass according to claim 14, wherein profiles for mounting the plurality of flexible shaft rollers are arranged on the auxiliary rack at intervals in the glass conveying direction, wherein the plurality of flexible shaft rollers and the profiles are arranged in parallel and in a one-to-one correspondence from up to down.

17. The tempering and forming apparatus for bent glass according to claim 16, wherein the flexible shaft curve forming mechanism comprises elastomers and a height adjustment mechanism, wherein the plurality of flexible shaft rollers are parallel to the elastomers and are mounted to the elastomers through a flexible shaft base, wherein middle portions of the elastomers are fixed to the profiles, wherein the height adjustment mechanism is configured to control connected elastomers to bend into curves, so as to cause the plurality of flexible shaft rollers to be curved.

18. The tempering and forming apparatus for bent glass according to claim 14, wherein the plurality of flexible shaft rollers are configured to be driven through middle portions.

* * * * *